(12) United States Patent
Jeong et al.

(10) Patent No.: US 9,497,420 B2
(45) Date of Patent: Nov. 15, 2016

(54) MOBILE TERMINAL AND METHOD OF CONTROLLING BROADCAST CONTENT PURCHASE THEREIN

(75) Inventors: Yong Chan Jeong, Suwon-si (KR); Kwang Hun Choi, Suwon-si (KR)

(73) Assignee: LG ELECTRONICS INC., Seoul (KR)

( * ) Notice: Subject to any disclaimer, the term of this patent is extended or adjusted under 35 U.S.C. 154(b) by 832 days.

(21) Appl. No.: 12/390,138

(22) Filed: Feb. 20, 2009

(65) Prior Publication Data

US 2009/0286469 A1 Nov. 19, 2009

(30) Foreign Application Priority Data

May 16, 2008 (KR) .................. 10-2008-0045445

(51) Int. Cl.
| | | |
|---|---|---|
| *H04N 21/41* | (2011.01) | |
| *H04N 21/81* | (2011.01) | |
| *H04N 21/472* | (2011.01) | |
| *H04L 5/00* | (2006.01) | |
| *G06Q 30/06* | (2012.01) | |
| *H04N 21/434* | (2011.01) | |
| *H04N 21/61* | (2011.01) | |
| *H04N 7/173* | (2011.01) | |

(Continued)

(52) U.S. Cl.
CPC ...... *H04N 7/17318* (2013.01); *G06Q 30/0601* (2013.01); *H04H 20/57* (2013.01); *H04L 5/0044* (2013.01); *H04N 21/4126* (2013.01); *H04N 21/41407* (2013.01); *H04N 21/4348* (2013.01); *H04N 21/47202* (2013.01); *H04N 21/6181* (2013.01); *H04N 21/8153* (2013.01); *H04N 21/8543* (2013.01)

(58) Field of Classification Search
CPC ............ H04N 21/4126; H04N 21/6181; H04N 21/4348; H04N 21/6131; H04N 21/8153; H04H 20/57; H04L 5/0044
USPC ............. 725/1, 8, 37–41, 62, 86, 87, 91, 92, 725/105, 109
See application file for complete search history.

(56) References Cited

U.S. PATENT DOCUMENTS 6,005,562 A * 12/1999 Shiga et al. .................. 715/721
6,035,304 A * 3/2000 Machida et al.
(Continued)

FOREIGN PATENT DOCUMENTS

| CN | 1235473 A | 11/1999 |
|---|---|---|
| CN | 1444827 A | 9/2003 |

(Continued)

OTHER PUBLICATIONS

DVB Organization, "TM-CBMS1551r2_preview of services in ESG guideline_TL.doc," DVB, Digital Video Broadcasting, c/o EBU—17A Ancienne Route—CH-1218 Grand Saconnex, Geneva—Switzerland, Jun. 13, 2006, XP017804471, pp. 1-4.

*Primary Examiner* — Benjamin R Bruckart
*Assistant Examiner* — Jason Thomas
(74) *Attorney, Agent, or Firm* — Birch, Stewart, Kolasch & Birch, LLP

(57) ABSTRACT

A mobile terminal including a wireless communication unit configured to receive broadcast relevant data, a controller configured to acquire identification information identifying image data matching a broadcast content from the received broadcast relevant data if a broadcast content purchase mode is entered to purchase the broadcast content, and a display configured to display the image data identified by the identification information.

11 Claims, 16 Drawing Sheets

(51) Int. Cl.
*H04N 21/8543* (2011.01)
*H04H 20/57* (2008.01)
*H04N 21/414* (2011.01)

(56) References Cited

U.S. PATENT DOCUMENTS

| | | | | |
|---|---|---|---|---|
| 6,147,714 | A * | 11/2000 | Terasawa et al. | 348/564 |
| 6,314,572 | B1 * | 11/2001 | LaRocca et al. | 725/60 |
| 6,766,956 | B1 * | 7/2004 | Boylan et al. | 235/462.45 |
| 7,536,705 | B1 * | 5/2009 | Boucher | H04L 12/1836 725/112 |
| 8,776,118 | B1 | 7/2014 | Rashkovskiy | |
| 2003/0005429 | A1 * | 1/2003 | Colsey | 725/8 |
| 2004/0055011 | A1 * | 3/2004 | Bae et al. | 725/62 |
| 2004/0081426 | A1 | 4/2004 | Tsukidate | |
| 2004/0135888 | A1 * | 7/2004 | Oakeson et al. | 348/207.1 |
| 2004/0255320 | A1 * | 12/2004 | Terao | G06Q 30/06 725/8 |
| 2005/0094812 | A1 * | 5/2005 | Terekhova et al. | 380/201 |
| 2005/0283807 | A1 * | 12/2005 | Lee et al. | 725/62 |
| 2006/0212902 | A1 * | 9/2006 | Seo et al. | 725/39 |
| 2007/0180133 | A1 | 8/2007 | Vedantham et al. | |
| 2007/0234396 | A1 | 10/2007 | Lee et al. | |
| 2007/0253423 | A1 * | 11/2007 | Chindapol et al. | 370/394 |
| 2007/0288950 | A1 | 12/2007 | Downey et al. | |
| 2008/0126222 | A1 | 5/2008 | Li et al. | |
| 2008/0155596 | A1 * | 6/2008 | Rosberg et al. | 725/39 |
| 2009/0049490 | A1 * | 2/2009 | White | 725/100 |
| 2011/0154394 | A1 * | 6/2011 | Brodersen et al. | 725/37 |

FOREIGN PATENT DOCUMENTS

| | | |
|---|---|---|
| CN | 1863396 A | 11/2006 |
| EP | 1 763 247 A2 | 3/2007 |
| KR | 10-2007-0075116 A | 7/2007 |
| WO | WO 2007/052989 A1 | 5/2007 |

* cited by examiner

FIG. 6

| Field | Semantics |
|---|---|
| Title | Specifies the title assigned to the described content. The title may be associaged to a lannguage. |
| MediaTitle | Specifies the reference to media representing the title of the described content.<br>NOTE 1 : This can take the form of a reference to an image or a sound available externally to the metadata, or the media data can be provided inline. |
| ServiceRef | Specifies the ServiceId of the Service Fragment to which the described contenet is associated to. |
| Synopsis | Specifies a short, textual summary of the described content. The language of the description is specified by the lang attribute. |
| Keyword | Specifies Keywords characterizing the described content. |
| Genre | Specifies a genre that characterizes the genre of the described content. |
| ContentType | Specifies the characteristic of the content e. g. if the content is download content, streaming content of a combination of both. If this element is present it overwrites the information specified in the field Service Type in the Service Fragment this Content belongs to. |
| ParentalGuidance | Specifies thee parental rating of the described content. This element can be associaged to a region. |
| Language | Secifies a language of the descrived content.<br>NOTE 2 : The language specification in the Content Fragment is seen to be user attracting data which can be displayed even if the related Acquisition Fragment is not available. However it is understood that the language specification in the Acquisition Fragment is more precise with respect to the components of the content. |
| CaptionLanguage | Specifies a sign language of the described content.<br>NOTE 3 : The caption language specification in the Content Fragment is seen to be user attraction data which can be displayed even if the related Acquisition Fragment is not available. however it is understood that the language specification in the Acquisition Fragment is more precise with respect to the components of the content. |
| SignLanguage | Specifies a sign language of the described content.<br>NOTE 4 : The sign language specification in the Content Fragment is seen to be user attracting data which can be displayed even if the related Acquisiting Fragment is not available. However it is understood that the language specification in the Acquisition Fragment is more precise with respect to the components if the content. |
| CreditsList | The list of credits (e.g. actors, directors, etc.) for the content. |
| RelatedMaterial | Specifies reference to material related to the described content.<br>For instrace, a related material associaged to an AV program may be a web site URL that provides more information about the AV program. |
| Duration | Specifies the duration of the described content.<br>NOTE 5 : The duration Speifies inthe Cotent Fragment differs from the duration which can be derived from the Schedule Event Fragment in that the first describes the duration for the content and the latter the time period inwhich it is available. |
| PrivateData | Generic element instantiated to add private data. This is used e.g. for fields of specific content such as a rights objects. |
| contentID | Specifies a unique Identifier of the instantiated Contenet Fragment. For the scope of uniqueness see the semantics of serviceID in clause 5.4.2. |

FIG. 7

```
<?xml version="1.0" encoding="UTF-8"?>
<xs:schema xmlns:xs="http://www.w3.org/2001/XMLSchema"
xmlns:fl="http://www.example.com/flute"
elementFormDefault:xs="qualified"
targetNamespace:xs="http://www.example.com/flute">

<xs:element name="FDT-Instance">
...

<xs:any processContents="skip" minOccurs="0" maxOccurs="unbounded"/>
                                    ┌─────711
<xs:attribute name=" Content-Location " type="xs:anyURI" use="required"/>
<xs:attribute name="TOI" type="xs:positiveInteger" use="required"/>
<xs:attribute name="Content-Length" type="xs:unsignedLong" use="optional"/>
<xs:attribute name="Transfer-Length" type="xs:unsignedLong" use="optional"/>
<xs:attribute name="Content-Type" type="xs:string" use="optional"/>
<xs:attribute name="Content-Encoding" type="xs:string" use="optional"/>
<xs:attribute name="Content-MD5" type="xs:base64Binary" use="optional"/>

<xs:attribute name="FEC-OTI-FEC-Encoding-ID" type="xs:unsignedLong" use="optional"/>
<xs:attribute name="FEC-OTI-FEC-Instance-ID" type="xs:unsignedLong" use="optional"/>
<xs:attribute name="FEC-OTI-Maximum-Source-Block-Length" type="xs:unsignedLong"
              use="optional"/>
<xs:attribute name="FEC-OTI-Encoding-Symbol-Length" type="xs:unsignedLong"
              use="optional"/>
<xs:attribute name="FEC-OTI-Max-Number-of-Encoding-Symbols" type="xs:unsignedLong"
              use="optional"/>
<xs:attribute name="FEC-OTI-Scheme-Specific-Info" type="xs:base64Binary" use="optional"/>

...
<xs:anyAttribute processContents="skip"/>

</xs:complexType>
</xs:element>

</xs:schema>
```

MOBILE TERMINAL AND METHOD OF CONTROLLING BROADCAST CONTENT PURCHASE THEREIN

The present application claims the benefit of the Korean Patent Application No. 10-2008-0045445, filed in Korea on May 16, 2008, which is hereby incorporated by reference as if fully set forth herein.

BACKGROUND OF THE INVENTION

Field of the Invention

The present invention relates to a mobile terminal and corresponding method for controlling a broadcast content purchase therein.

Discussion of the Related Art

A mobile terminal is a device which may be configured to perform various functions. Examples of such functions include data and voice communications, capturing images and video via a camera, recording audio, playing music files via a speaker system, and displaying images and video on a display. Some mobile terminals include additional functionality which supports game playing, while other mobile terminals are configured as multimedia players. More recently, mobile terminals have been configured to receive broadcast and multicast signals, which permit viewing of content such as videos and television programs.

Efforts are ongoing to support and increase the functionality of mobile terminals. Such efforts include software and hardware improvements, as well as changes and improvements in the structural components which form the mobile terminal.

Also, in the related art broadcast receiving terminal, when a user selects a purchase of a specific broadcast content, basic text information such as a title of a broadcast content to be purchased, amount information and the like is provided. However, the basic text information provided to the user is generally not enough information the user needs to make a decision about purchasing the program.

SUMMARY OF THE INVENTION

Accordingly, one object of the present invention is to address the above-noted and other drawbacks of the related art.

Another object of the present invention is to provide a mobile terminal and method of providing sufficient information and visual effects on a broadcast content purchase.

To achieve these objects and other advantages and in accordance with the purpose of the invention, as embodied and broadly described herein, the present invention provides in one aspect a mobile terminal including a wireless communication unit configured to receive broadcast relevant data, a controller configured to acquire identification information identifying image data matching a broadcast content from the received broadcast relevant data if a broadcast content purchase mode is entered to purchase the broadcast content, and a display configured to display the image data identified by the identification information.

In another aspect, the present invention provides a method of controlling a mobile terminal, and which includes receiving broadcast relevant data, entering a broadcast content purchase mode to purchase broadcast content, acquiring identification information identifying image data matching the broadcast content from the received broadcast relevant data, and displaying the image data identified by the identification information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram of a data structure for defining identification information of image data matching a broadcast content in a specific field within broadcast relevant data according to one embodiment of the present invention;

FIG. 7 is a diagram of a data structure for defining identification information of general image data in a specific field within broadcast relevant data according to one embodiment of the present invention;

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

Figure 1:
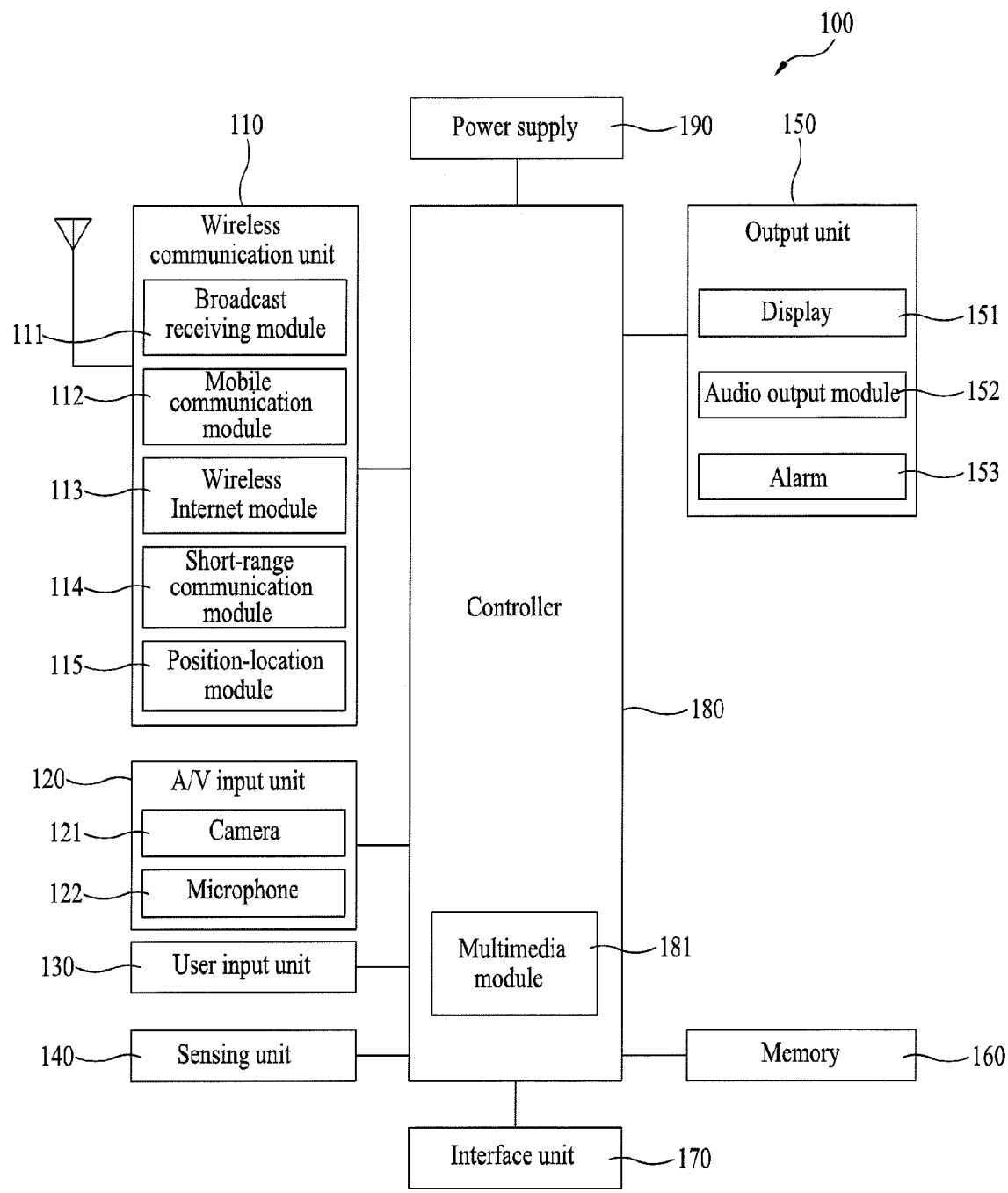
FIG. 1 is a block diagram of a mobile terminal according to an embodiment of the present invention.

FIG. 1 is a block diagram of mobile terminal 100 according to an embodiment of the present invention. The mobile terminal may be implemented using a variety of different types of mobile terminals. Examples of such mobile terminals include mobile phones, user equipment, smart phones, computers, digital broadcast mobile terminals, personal digital assistants, portable multimedia players (PMP) and navigators. By way of non-limiting example only, further description will be with regard to a mobile terminal. However, such teachings apply equally to other types of mobile terminals. FIG. 1 shows the mobile terminal 100 having various components, but it is understood that implementing all of the illustrated components is not a requirement. Greater or fewer components may alternatively be implemented.

As shown in FIG. 1, the mobile terminal 100 includes a wireless communication unit 110 configured with several commonly implemented components. For instance, the wireless communication unit 110 includes one or more components which permits wireless communication between the mobile terminal 100 and a wireless communication system or network within which the mobile terminal is located.

Further, a broadcast receiving module 111 receives a broadcast signal and/or broadcast associated information from an external broadcast managing entity via a broadcast channel. The broadcast channel may include a satellite channel and a terrestrial channel. In addition, the broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of the digital multimedia broadcasting (DMB) system and an electronic service guide (ESG) of the digital video broadcast-handheld (DVB-H) system.

The broadcast signal may be implemented as a TV broadcast signal, a radio broadcast signal, and a data broadcast signal, among others. If desired, the broadcast signal may further include a broadcast signal combined with a TV or radio broadcast signal. Also, the broadcast receiving module 111 may be configured to receive broadcast signals transmitted from various types of broadcast systems. In a non-limiting example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system. Receiving of multicast signals is also possible. Further, data received by the broadcast receiving module 111 may be stored in a suitable device, such as a memory 160.

In addition, a mobile communication module 112 transmits/receives wireless signals to/from one or more network entities (e.g., a base station, a Node-B). Such signals may represent audio, video, multimedia, control signaling, and data, among others. Further, the wireless Internet module 113 supports Internet access for the mobile terminal, and may be internally or externally coupled to the mobile terminal.

Also, a short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 identifies or otherwise obtains the location of the mobile terminal. In addition, this module may be implemented using global positioning system (GPS) components which cooperate with associated satellites, network components, and combinations thereof. An Audio/video (A/V) input unit 120 is configured to provide audio or video signal input to the mobile terminal. As shown, the A/V input unit 120 includes a camera 121 and a microphone 122. The camera receives and processes image frames of still pictures or video. Also, two or more microphones and/or cameras may be used.

Further, the microphone 122 receives an external audio signal while the portable device is in a particular mode, such as phone call mode, recording mode and voice recognition. The audio signal is processed and converted into digital data. Also, the portable device, and in particular, the A/V input unit 120, can include assorted noise removing algorithms to remove noise generated in the course of receiving the external audio signal.

In addition, data generated by the A/V input unit 120 may be stored in the memory 160, utilized by the output unit 150, or transmitted via one or more modules in the communication unit 110. The user input unit 130 also generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display.

Further, a sensing unit 140 provides status measurements of various aspects of the mobile terminal. For instance, the sensing unit 140 may detect an open/close status of the mobile terminal, a relative positioning of components (e.g., a display and keypad) of the mobile terminal, a change of position of the mobile terminal or a component of the mobile terminal, a presence or absence of user contact with the mobile terminal, an orientation or acceleration/deceleration of the mobile terminal, etc.

As an example, when the mobile terminal 100 is configured as a slide-type mobile terminal, the sensing unit 140 may sense whether a sliding portion of the mobile terminal is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal with external devices such as wired/wireless headphones, external chargers, power supplies, storage devices configured to store data (e.g., audio, video, pictures, etc.), earphones, and microphones, among others. The interface unit 170 may also be configured using a wired/wireless data port, a card socket (e.g., for coupling to a memory card and a device equipped with identity module), audio input/output ports and video input/output ports.

In this instance, the identity module is a chip that stores various types of information for identifying or authenticating a use or authority of the terminal 100. In addition, the identity module can include one of a user identity module (UIM), a subscriber identity module (SIM), a universal subscriber identity module (USIM) and the like. In particular, the identity module can include a module for identifying or authenticating an authority for a broadcast purchase and/or a broadcast viewing using the terminal 100. An identity device provided with the identity module can be manufactured as a smart card. Thus, the identity device can be connected to the terminal 100 via a port for connecting the identity device.

Further, an output unit 150 generally includes various components which support the output requirements of the mobile terminal. For example, a display 151 is implemented to visually display information associated with the mobile terminal 100. For instance, if the mobile terminal is operating in a phone call mode, the display 151 provides a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device. Further, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal may also include one or more of such displays. An example of a two-display embodiment is one in which one display is configured as an internal display (viewable when the mobile terminal is in an opened position) and a second display configured as an external display (viewable in both the open and closed positions).

Further, a proximity sensor can be provided within the touchscreen or around the touch screen, or can be provided within the sensing unit 140. The proximity sensor is the sensor that detects a presence or non-presence of an object approaching a prescribed detecting surface or an object existing around the proximity sensor using an electromagnetic field strength or infrared ray without mechanical contact. Also, the proximity sensor has durability longer than that of a contact type sensor and also has utility wider than that of the contact type sensor.

In addition, the proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like.

One example for the operational principle of the radio frequency oscillation proximity sensor is explained as follows. First, while an oscillation circuit is oscillating a full-wave radio frequency, if an object approaches in the vicinity of the sensor detecting surface, an oscillation amplitude of the oscillation circuit attenuates or stops.

Such a variation is then converted into an electric signal to detect a presence or non-presence of the object. Therefore, even if a different substance except a metallic substance is placed between the radio frequency oscillation proximity sensor and the object, the proximity switch is able to detect a specific object without interference with the different substance.

Also, when the touch screen is an electrostatic type, the proximity sensor can be configured to detect a proximity of a pointer using a variation of an electric field according to the proximity of the pointer. Therefore, if the pointer is located in the vicinity of the touchscreen but does not contact the touchscreen, the sensor can detect the position of the pointer and the distance between the pointer and the touchscreen.

In the following description, an action corresponding to a pointer approaching but not contacting the touch screen is referred to as a 'proximity touch', and an action that a pointer actually touches the touchscreen is referred to as a 'contact touch'. Further, the position on the touchscreen proximity-touched by the pointer means the position of the pointer which vertically opposes the touchscreen when the pointer performs the proximity touch.

In addition, the proximity sensor detects a proximity touch and a proximity touch pattern (e.g., a proximity touch distance, a proximity touch duration, a proximity touch position, a proximity touch shift state, etc.). Also, information corresponding to the detected proximity touch action and the detected proximity touch pattern can be output to the touchscreen.

FIG. 1 further shows the output unit 150 having an audio output module 152 which supports the audio output requirements of the mobile terminal 100. The audio output module 152 may be implemented using one or more speakers, buzzers, other audio producing devices, and combinations thereof. The audio output module 152 functions in various modes including a call-receiving mode, a call-placing mode, a recording mode, a voice recognition mode and a broadcast reception mode. During operation of the terminal 100, the audio output module 152 outputs audio relating to a particular function (e.g., call received, message received, and errors).

The output unit 150 also includes an alarm 153, which is used to signal or otherwise identify the occurrence of a particular event associated with the mobile terminal. Typical events include a call received, a message received and user input received. An example of such output includes the providing of tactile sensations (e.g., vibration) to a user. For instance, the alarm 153 may be configured to vibrate responsive to the mobile terminal receiving a call or message.

As another example, vibration is provided by alarm 153 responsive to receiving user input at the mobile terminal, thus providing a tactile feedback mechanism. Further, the various output provided by the components of the output unit 150 may be separately performed, or such output may be performed using any combination of such components.

In addition, the memory 160 is used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 also controls the overall operations of the mobile terminal. For instance, the controller 180 performs the control and processing associated with voice calls, data communications, video calls, camera operations and recording operations. If desired, the controller may include a multimedia module 181 which provides multimedia play-back. The multimedia module 181 may be configured as part of the controller 180, or may be implemented as a separate component.

In addition, the controller 180 is able to perform pattern recognizing processing for recognizing a handwriting input performed on the touchscreen as a character or recognizing a picture drawing input performed on the touchscreen as an image. The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the terminal 100 may be implemented in a variety of different configurations. Examples of such configurations include a folder-type, slide-type, bar-type, rotational-type, swing-type and combinations thereof. The following description refers primarily to a slide-type mobile terminal. However, such teachings apply equally to other types of mobile terminals.

Figure 2A:
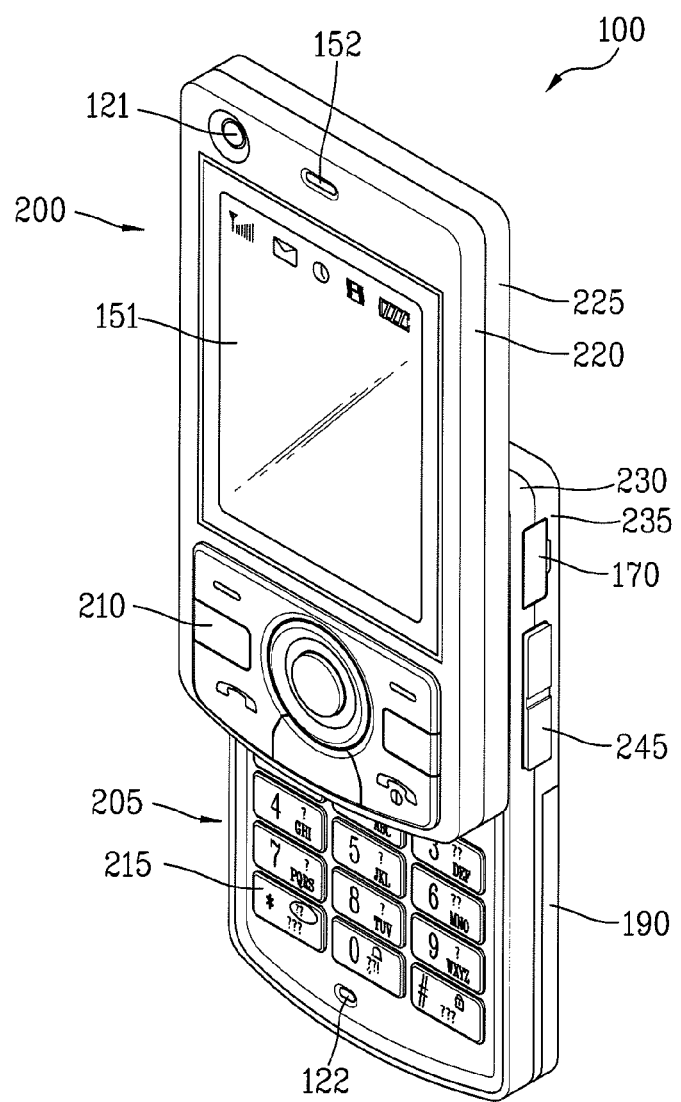
FIG. 2A is a front perspective view of a mobile terminal according to an embodiment of the present invention.

Next, FIG. 2A is a front perspective view of a mobile terminal according to an embodiment of the present invention. In FIG. 2A, the mobile terminal 100 is shown having a first body 200 configured to slideably cooperate with a second body 205. Further, the user input unit 130 (described in FIG. 1) is implemented using function keys 210 and keypad 215. The function keys 210 are associated with first body 200, and the keypad 215 is associated with second body 205. In addition, the keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body 200 is positioned over the second body 205 in such a manner that the keypad 215 is substantially or completely obscured by the first body 200. In the open position, a user can access the keypad 215, as well as the display 151 and function keys 210, is possible. The function keys 210 are convenient to a user for entering commands such as start, stop and scroll.

In addition, the mobile terminal 100 is operable in either a standby mode (e.g., able to receive a call or message, receive and respond to network control signaling, etc.), or an active call mode. The mobile terminal 100 generally functions in a standby mode when in the closed position, and an active mode when in the opened position. This mode configuration may be changed as required or desired.

Further, the first body 200 is shown formed from a first case 220 and a second case 225, and the second body 205 is shown formed from a first case 230 and a second case 235. The first and second cases are usually formed from a suitably ridge material such as injection molded plastic, or formed using a metallic material such as stainless steel (STS) and titanium (Ti). Also, one or more intermediate cases may be provided between the first and second cases of one or both of the first and second bodies 200, 205. The first and second bodies 200, 205 are sized to receive electronic components necessary to support operation of the mobile terminal 100.

In addition, the first body 200 is shown having the camera 121 and the audio output unit 152, which is configured as a speaker, positioned relative to the display 151. Also, the camera 121 may be constructed in such a manner that it can be selectively positioned (e.g., rotated, swiveled, etc.) relative to first body 200.

Further, the function keys 210 are positioned adjacent to a lower side of the display 151, which is shown implemented as an LCD or OLED. As discussed above, the display may also be configured as a touchscreen having an underlying touchpad which generates signals responsive to user contact (e.g., a finger, a stylus, etc.) with the touchscreen.

In addition, the second body 205 is shown having the microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. The interface unit 170 is also shown positioned adjacent to the side keys 245, and the power supply 190 in a form of a battery is located on a lower portion of the second body 205.

Figure 2B:
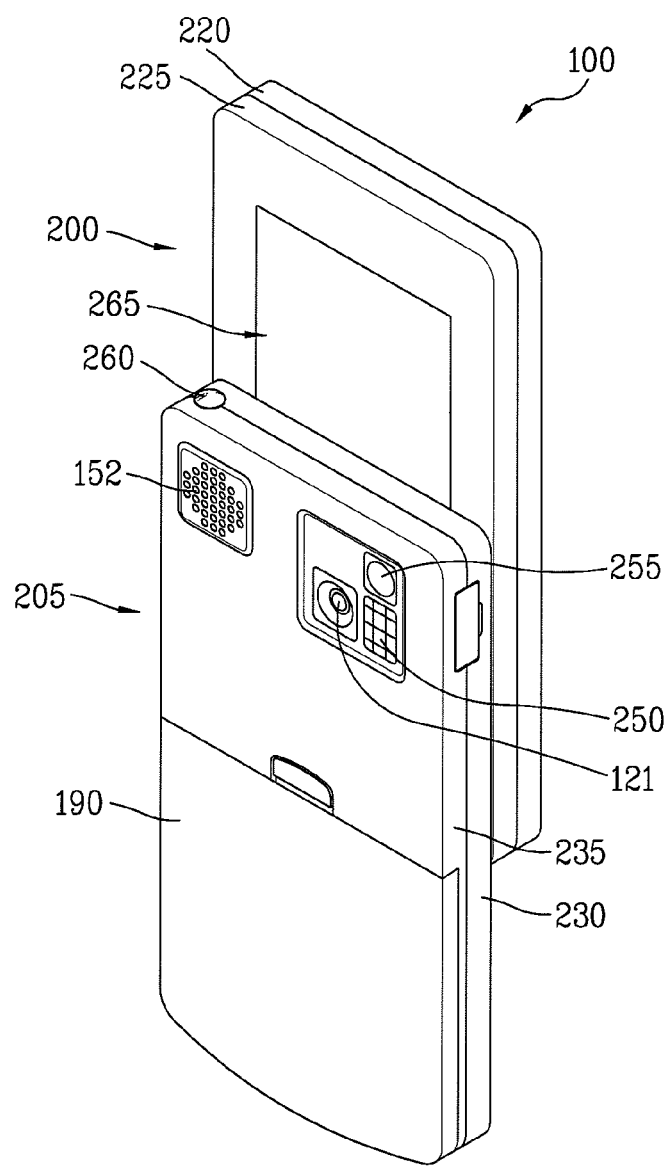
FIG. 2B is a rear perspective view of the mobile terminal shown in FIG. 2A.

Next, FIG. 2B is a rear view of the mobile terminal shown in FIG. 2A. FIG. 2B shows the second body 205 having another camera 121, and an associated flash 250 and mirror 255. The flash operates in conjunction with the camera 121 of the second body, and the mirror 255 is useful for assisting a user to position the camera 121 in a self-portrait mode. Further, the camera 121 of the second body faces a direction which is opposite to a direction faced by the camera 121 of the first body 200 (FIG. 2A). Each of the cameras 121 of the first and second bodies may have the same or different capabilities.

In one embodiment, the camera of the first body 200 operates with a relatively lower resolution than the camera of the second body 205. Such an arrangement works well during a video conference, for example, in which the reverse link bandwidth capabilities may be limited. In addition, the relatively higher resolution of the camera of the second body 205 (FIG. 2B) is useful for obtaining higher quality pictures for later use or for communicating to others.

The second body 205 also includes another audio output module 152 configured as a speaker, and which is located on an upper side of the second body. Thus, the audio output modules of the first and second bodies 200, 205, may cooperate to provide stereo output. Moreover, either or both of these audio output modules 152 may be configured to operate as a speakerphone.

In addition, a broadcast signal receiving antenna 260 is shown located at an upper end of the second body 205. The antenna 260 functions in cooperation with the broadcast receiving module 111 (FIG. 1), and may be fixed or configured to retract into the second body 205. Further, the rear side of the first body 200 includes a slide module 265, which slideably couples with a corresponding slide module located on the front side of the second body 205.

It is understood that the illustrated arrangement of the various components of the first and second bodies 200, 205, may be modified as required or desired. For example, some or all of the components of one body may alternatively be implemented on the other body. In addition, the location and relative positioning of such components are not critical to many embodiments, and as such, the components may be positioned at locations which differ from those shown by the representative figures.

Figure 3A:
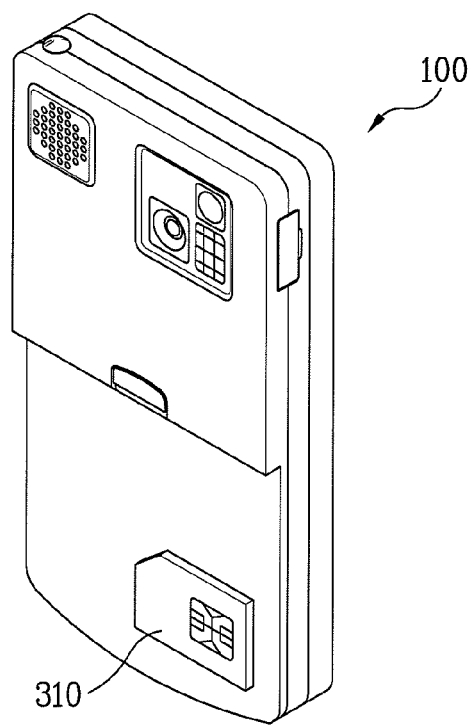
FIGS. 3A and 3B are perspective diagrams for representing a detachable identity device in a terminal according to one embodiment of the present invention.
Figure 3B:
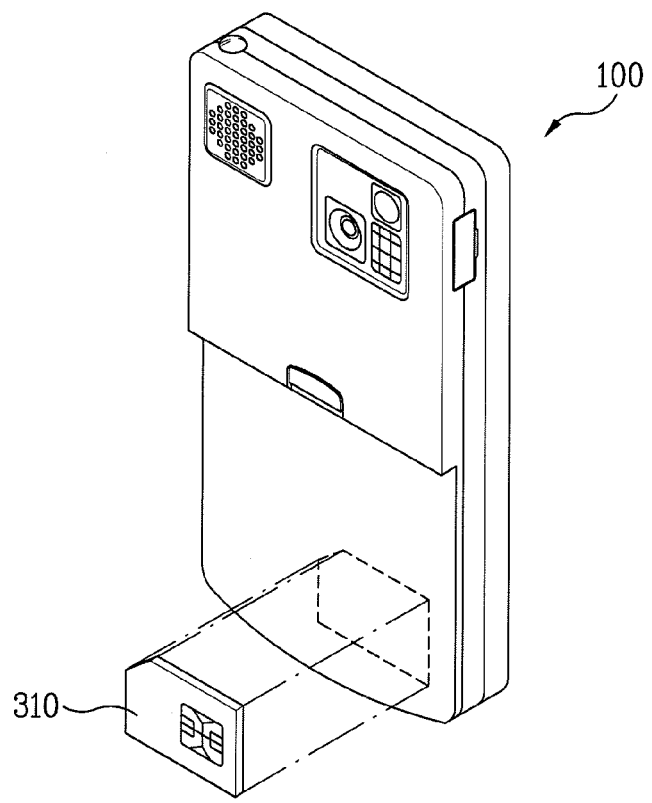

Next, FIGS. 3A and 3B are perspective diagrams for representing an identity device that is detached from a mobile terminal according to one embodiment of the present invention. Further, the identity device can include an SIM card for example.

Referring to FIGS. 3A and 3B, the identity device 310 is detachably provided to the mobile terminal 100. Hence, a new identity device can be loaded in the mobile terminal 100 by replacing an old identity device. Optionally, the identity device 310 can be loaded in the mobile terminal 100 by being combined with the interface unit 170. Alternatively, the identity device 310 can be provided to the mobile terminal 100 by being connected to a connector separately provided for the connection with the identity device 310. In addition, a connecting mechanism for connecting the identity device 310 and the mobile terminal 100 together can be provided to any one of backside, lateral sides, a front side and the like of the mobile terminal 100.

In addition, the mobile terminal 100 shown in FIGS. 1 to 3B can be configured to operate in a wire/wireless communication system, a satellite based communication system or a communication system capable of transmitting data carried on frames or packets. The mobile terminal 100 of FIGS. 1-3B may also be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, the following description relates to a CDMA communication system, but such teachings apply equally to other system types.

Figure 4:
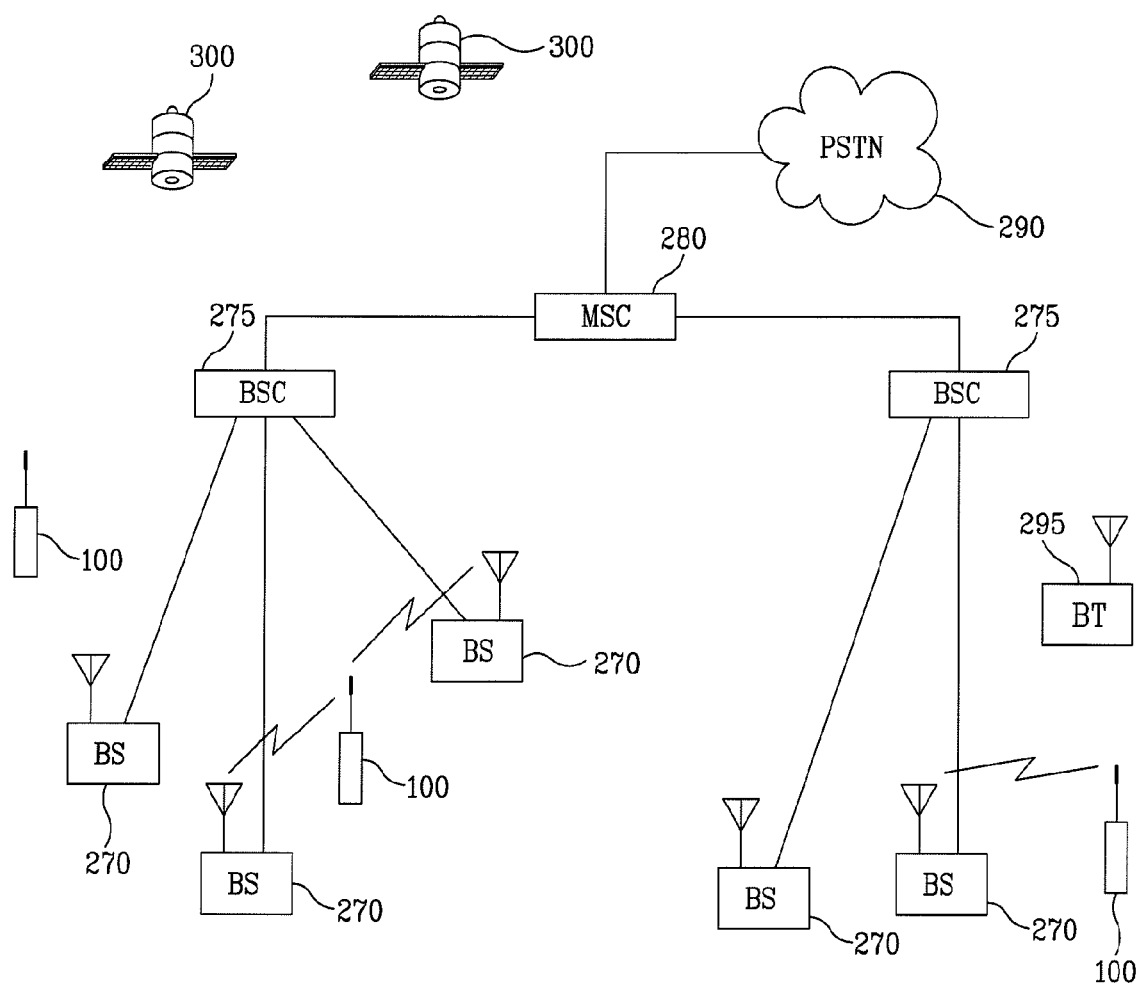
FIG. 4 is a block diagram of a CDMA wireless communication system operable with the mobile terminal of FIGS. 1-3B.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a public switch telephone network (PSTN) 290, and is also configured to interface with the BSCs 275. Further, the BSCs 275 are coupled to the base stations 270 via backhaul lines, which may be configured in accordance with any of several known interfaces including, for example, E1/T1, ATM, IP, PPP, Frame Relay, HDSL, ADSL, or xDSL. The communication system may also include more than two BSCs 275.

Further, each base station 270 may include one or more sectors, each sector having an omnidirectional antenna or an antenna pointed in a particular direction radially away from the base station 270. Alternatively, each sector may include two antennas for diversity reception. Each base station 270 may also be configured to support a plurality of frequency assignments, with each frequency assignment having a particular spectrum (e.g., 1.25 MHz, 5 MHz).

In addition, the intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270. The base stations may also be denoted "cell sites." Alternatively, individual sectors of a given base station 270 may be referred to as cell sites.

A broadcasting transmitter 295 is also shown broadcasting to mobile terminals 100 operating within the system. The broadcast receiving module 111 (FIG. 1) of the portable mobile terminal is configured to receive broadcast signals transmitted by the broadcasting transmitter 295. Similar arrangements may be implemented for other types of broadcast and multicast signaling (as discussed above).

FIG. 4 further depicts several global positioning system (GPS) satellites 300. Such satellites 300 can be used to facilitate locating the position of some or all of the mobile terminals 100. Two satellites are depicted, but useful positioning information may be obtained with greater or fewer satellites. The position-location module 115 (FIG. 1) of the mobile terminal 100 is also configured to cooperate with the satellites 300 to obtain desired position information. Other types of position detection technology, (i.e., location technology that may be used in addition to or instead of GPS location technology) may alternatively be implemented. Further, some or all of the GPS satellites 300 may alternatively or additionally be configured to provide satellite DMB transmissions.

In addition, during typical operation of the wireless communication system, the base stations 270 receive sets of reverse-link signals from various mobile terminals 100 that are engaging in calls, messaging, and other communications. Each reverse-link signal received by a given base station 270 is processed within that base station, and the resulting data is forwarded to an associated BSC 275.

The BSC 275 also provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

In the following description, the steps of a broadcast content purchase controlling method in a mobile terminal according to an embodiment of the present invention will explained with reference to the flowchart shown in FIG. 5. FIG. 1 will also be referred to in this description.

Figure 5:
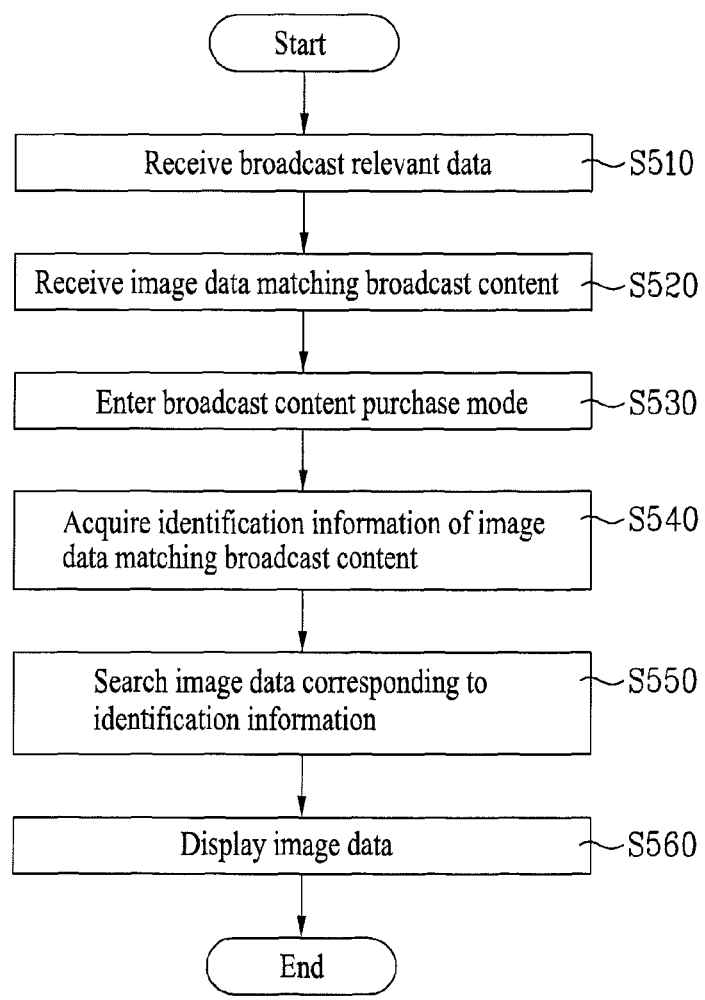
FIG. 5 is a flowchart illustrating a method of controlling a broadcast content purchase in a mobile terminal according to one embodiment of the present invention.

Referring to FIG. 5, the mobile terminal 100 receives broadcast relevant data using the wireless communication unit 110 (S510). In addition, the broadcast relevant can be regarded as the same as the broadcast relevant data discussed above. Also, ESG data of the DVB-H system can be regarded as a representative example for the broadcast relevant data.

Further, the receiving step S510 can be performed periodically or randomly. Alternatively, the receiving step S510 can be performed if a user inputs a request action for receiving the broadcast relevant data via the user input unit 130. In yet another example, if an expiry period is defined in the broadcast relevant data, the receiving step S510 can be performed automatically after the expiry period defined in the previously stored broadcast relevant data has expired.

Further, in the receiving step S510, the mobile terminal 100 is able to receive broadcast relevant data via various networks and is also able to use a module suitable for the corresponding network system. For instance, the broadcast relevant data can be received via a broadcasting network using the broadcast receiving module 111, via a mobile communication network using the mobile communication module 112, via the Internet using the wireless internet module 113, and/or via a short-range communication network using the short-range communication module 114.

The broadcast relevant data received in the receiving step S510 can also be stored in the memory 160 according to a control signal of the controller 180. The controller 180 then compares the previously stored broadcast relevant data to the received broadcast relevant data, and if the two broadcast relevant data are different from each other, the controller 180 is able to update the previously stored broadcast relevant data with reference to the recently received broadcast relevant data.

In particular, according to one embodiment of the present invention, identification information of image data matching or corresponding to a broadcast content can be included in a specific field within the broadcast relevant data. Thus, if a broadcast content is purchased by a user of the mobile terminal 100, the content can include a broadcast channel or channels and a viewing authority to the mobile terminal 100 for a predetermined period of time, a broadcast program or a package type broadcast content having a package of a plurality of broadcast channels/programs.

For instance, in the DVB-H system, the package type broadcast content can be referred to as a pay per view event package. Namely, the package type broadcast content may correspond to the broadcast content having a single package of a plurality of events (corresponding to the broadcast channels or programs). When a broadcast content purchase mode is entered, the image data is displayed as a purchase picture of the corresponding broadcast content and may be associated with a specific broadcast content.

For instance, in the DVB-H system, the image data can be referred to as a customizable animation image. The image data can also be used as a standby picture when entering or switching a broadcast channel. Further, the identification information can include such information for identifying the image data as a name, identification code, identification number and the like of the image data that matches the corresponding broadcast content.

FIG. 6 is a diagram of a data structure for defining identification information of image data matching a broadcast content in a specific field within broadcast relevant data according to one embodiment of the present invention. In particular, FIG. 6 shows broadcast relevant data being ESG data.

Referring to FIG. 6, identification information of image data matching a broadcast content can be defined in a synopsis field 611 that is defined in a content fragment within the ESG data. Generally, a synopsis of a broadcast content is included as a text in a synopsis field. Further, the identification information can be included in another field as well as the synopsis field.

FIG. 7 is a diagram of a data structure for defining identification information of general image data in a specific field within broadcast relevant data according to one embodiment of the present invention. Specifically, FIG. 7 relates to the broadcast relevant data being ESG data. The image data described in FIG. 7 matches a broadcast content, and can be transmitted to the mobile terminal 100 from an external environment.

Referring to FIG. 7, the identification information of the image data can be included in a Content-Location 711 defined in file delivery data within the ESG data. The mobile terminal 100 then checks whether identification information identical to the former identification information acquired from the synopsis field shown in FIG. 6 is included in the Content-Location 711 shown in FIG. 7 and thus is able to recognize image data that matches a specific broadcast content.

Referring again to FIG. 5, the mobile terminal 100 receives the image data via the wireless communication unit 110 (S520). In this instance, the received image data may or may not match a specific broadcast content. However, the following description assumes the image data received in the receiving step S520 matches a specific broadcast content.

In addition, in the receiving step S520, the wireless communication unit 110 receives image data via various networks and is able to use a module suitable for the corresponding network system. For instance, the image data can be received via a broadcasting network using the broadcast receiving module 111, via a mobile communication network using the mobile communication module 112, via the Internet using the wireless internet module 113, and via a short-range communication network using the short-range communication module 114.

Further, the image data received in the receiving step S520 can be received via a data packet equal to or different from that of the above-mentioned broadcast relevant data. If the image data is received via the equal data packet, the image data can be received by being included in the broadcast relevant data or by not being included in the broadcast relevant data.

In the following description, reception structures of broadcast relevant data and image data are explained with reference to FIGS. 8A to 8C. Specifically, the broadcast relevant data is assumed to be the ESG data, and the ESG data is received in a predetermined period interval.

Figure 8A:
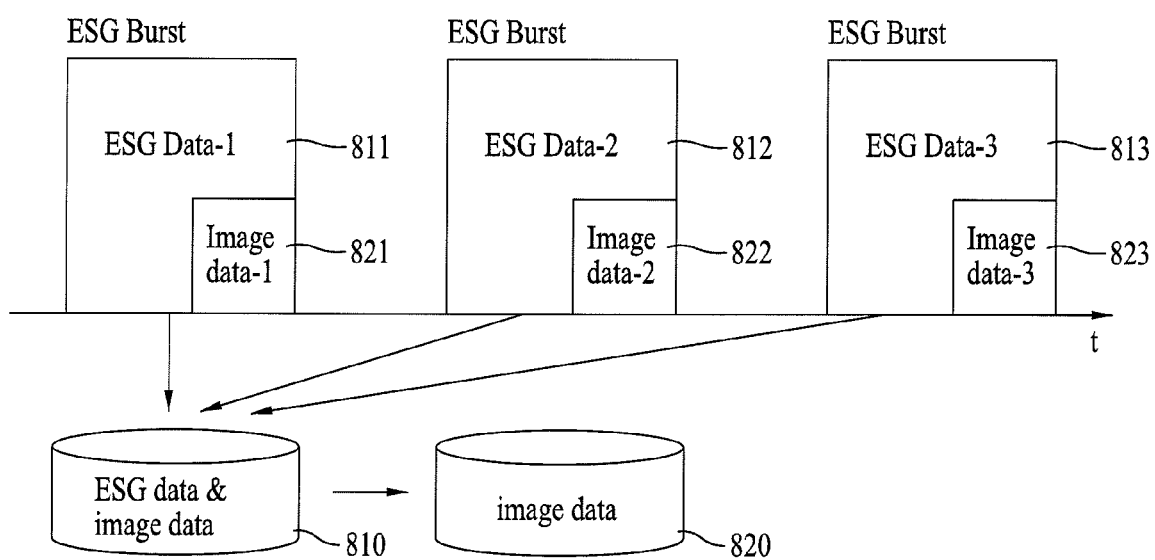
FIGS. 8A to 8C are diagrams illustrating different reception structures of broadcast relevant data and image data according to one embodiment of the present invention.

In more detail, FIG. 8A shows when image data is received by being included in broadcast relevant data via the same data packet. Referring to FIG. 8A, the ESG data is received with a predetermined period interval, and a plurality of image data 821, 822 and 823 are included in a corresponding plurality of ESG data 811, 812 and 813 received in a plurality of periods, respectively.

Thus, using the controller 180, the mobile terminal 100 is able to configure a full ESG data 810 by adding a plurality of the ESG data received in the corresponding periods together and is also able to extract full image data 820 from the full ESG data 810. In particular, when the image data and broadcast relevant data are received by the scheme shown in FIG. 8A, if a broadcast content providing subject is different from a broadcast relevant data providing subject, the broadcast content providing subject has to request to the broadcast relevant data providing subject to change the image data. This is because the image data change brings about the change of the broadcast relevant data.

Figure 8B:
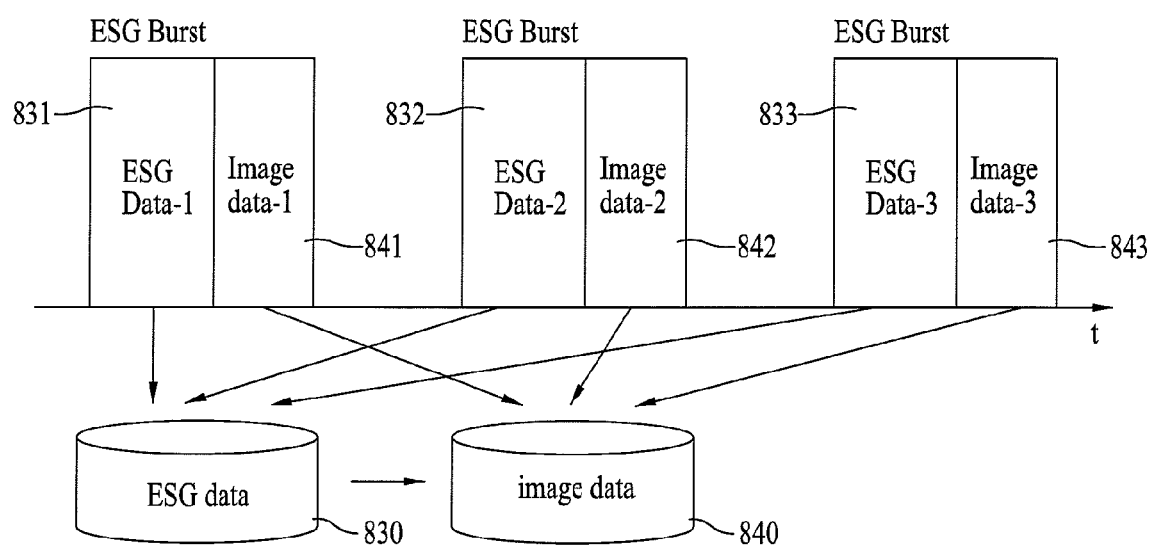

Next, FIG. 8B relates to the image data not being included in the broadcast relevant data, but being received via the same data packet of the broadcast relevant data. Referring to FIG. 8B, a data packet containing the ESG data and the image data is received with a predetermined period interval. As shown, a plurality of ESG data 831, 832 and 833 and a plurality of image data 841, 842 and 843 are included in a plurality of data packets received in a plurality of periods, respectively. Thus, using the controller 180, the mobile terminal 100 is able to configure a full ESG data 830 and a full image data 840 by extracting the ESG data and the image data from the data packets received in the corresponding periods, respectively.

In this instance, a single data packet is divided into a plurality of areas, and the ESG data and the image data are transmitted by being allocated to the corresponding areas, respectively. Thus, because the ESG data and the image data are received via the same data packet, they have the same data packet ID.

Figure 8C:
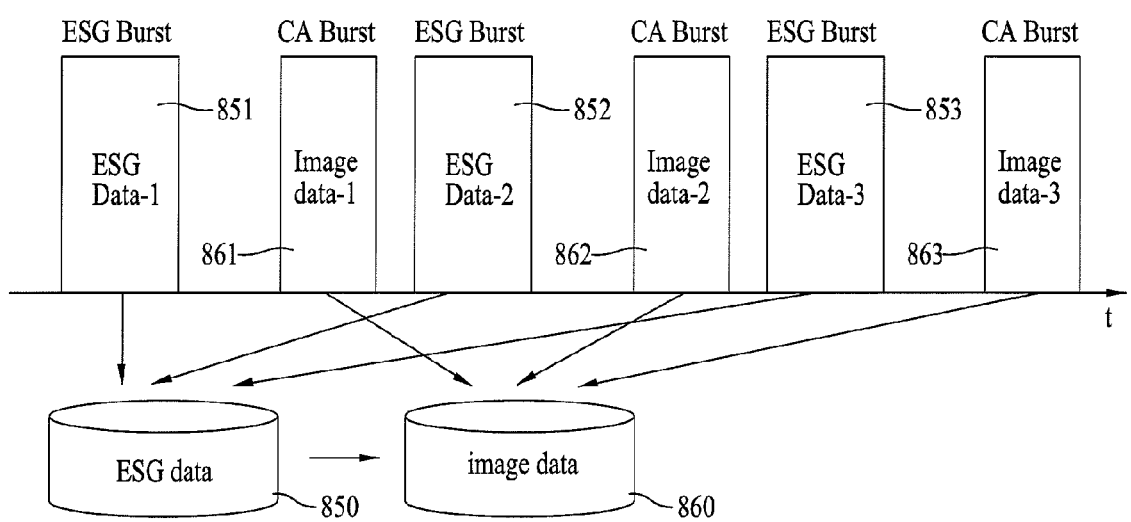

Next, FIG. 8C relates to the image data being received via a data packet different from that of the broadcast relevant data. Referring to FIG. 8C, a plurality of ESG data 851, 852 and 853 and a plurality of image data 861, 862 and 863 are received via a plurality of data packets received with predetermined period intervals, respectively.

Thus, using the controller 180, the mobile terminal 100 is able to configure a full ESG data 850 and a full image data 860 by extracting the ESG data 851, 852 and 853 and the image data 861, 862 and 863 from the data corresponding packets containing the ESG data and the image data, respectively. Because the ESG data and the image data are received via different data packets, respectively, they have different data packet IDs.

In particular, when the image data and the broadcast relevant data are received by the scheme shown in FIG. 8B or FIG. 8C, although a broadcast content providing subject is different from a broadcast relevant data providing subject, the broadcast content providing subject is able to freely change the image data without making a request to the broadcast relevant data providing subject, because the image data is not contained in the broadcast relevant data but is configured as separate data.

Referring again back to FIG. 5, the broadcast relevant data and the image data received in the receiving steps S510 and S520 are stored in the memory 160 according to a control signal of the controller 180. Subsequently, the mobile terminal 100 enters a broadcast content purchase mode (S530).

Further, when the mobile terminal 100 has no viewing rights for such a broadcast content selected by a user, and when a content purchase function is selected by a user, the mobile terminal 100 enters the broadcast content purchase mode. In addition, the viewing authority for the broadcast content can be managed by the controller 180 or an element separately provided for broadcast viewing authority management (e.g., a conditional access system (CAS) module or the identify device 310).

Figure 9A:
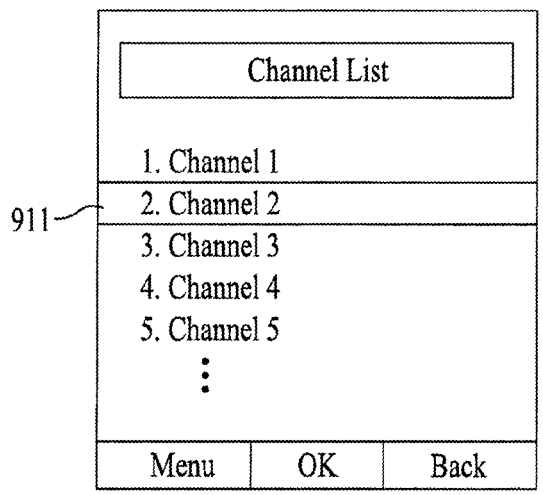
FIGS. 9A to 9D are overviews of display screens illustrating entering a broadcast content purchase mode if a mobile terminal according to one embodiment of the present invention fails to have viewing authority for a broadcast content.
Figure 9B:
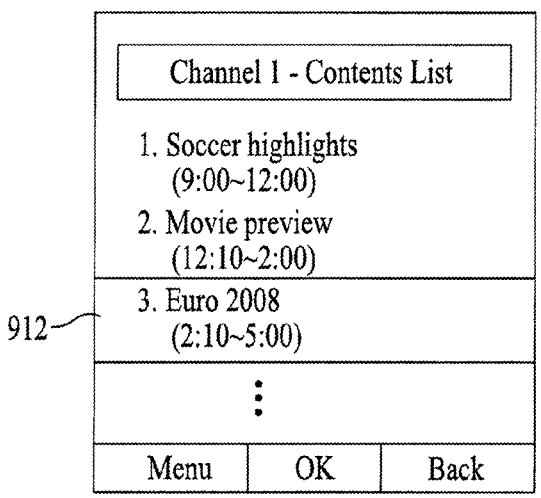
Figure 9C:
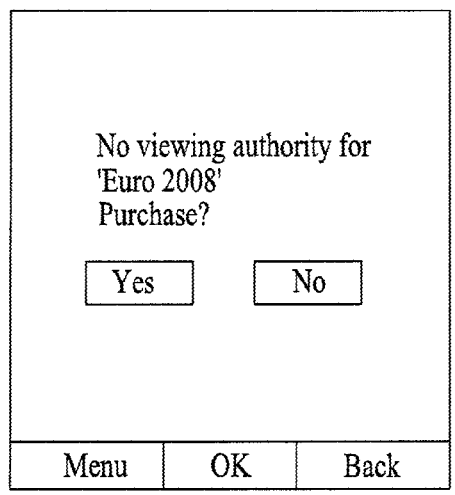

For instance, referring to FIGS. 9A to 9C, if a specific broadcast channel 911 is selected in a broadcast channel selecting mode (FIG. 9A) or if a specific broadcast content 912 is selected in a broadcast content selecting mode (FIG. 9B), the mobile terminal 100 is able to decide the viewing authority for the selected broadcast channel 911 or the selected broadcast content 912.

If the mobile terminal 100 decides that there is no viewing authority, the mobile terminal 100 enters the broadcast content purchase mode and then displays a window on the display 151 allowing the user to purchase the broadcast content (FIG. 9C). The mobile terminal 100 also displays information indicating the viewing authority for the selected broadcast channel 911 or the selected broadcast content 912 fails to exist (FIG. 9C).

Figure 10A:
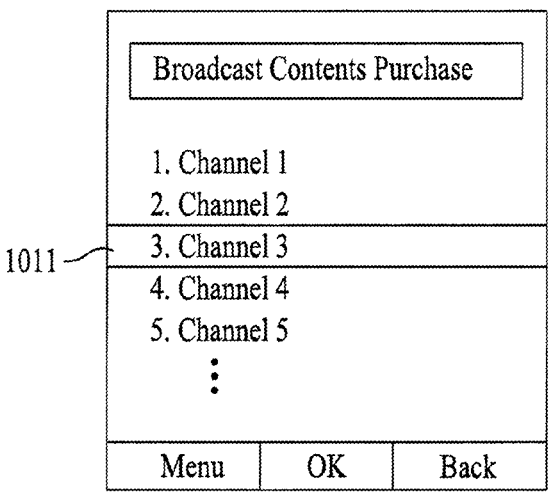
FIGS. 10A to 10C are overviews of display screens illustrating entering a broadcast content purchase mode if a broadcast purchase function is selected in a mobile terminal according to one embodiment of the present invention.
Figure 10B:
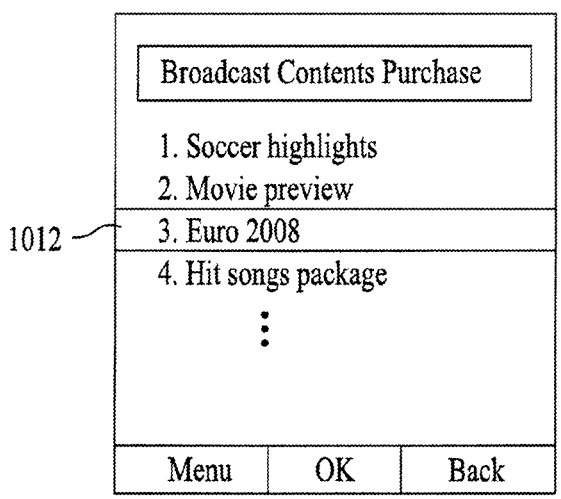

If the mobile terminal 10 decides that a viewing authority does exist, the mobile terminal 100 outputs a broadcast program provided from the selected broadcast channel or the selected broadcast content via the output unit 150. For instance, referring to FIGS. 10A and 10B, as the broadcast channel purchase mode is entered, the mobile terminal 100 displays a list of purchase target broadcast channels so that a user can select a specific broadcast channel (FIG. 10A). Alternatively, as the broadcast content purchase mode is entered, the mobile terminal 100 displays a list of purchase target broadcast contents so that a user can select a specific broadcast content (FIG. 10B).

In addition, as shown in FIG. 5, as the broadcast content purchase mode is entered, the mobile terminal 100 acquires identification information of image data matching a specific broadcast content from the broadcast relevant data received in the receiving step S510 (S540). In particular, the acquiring step S540 can be performed by the controller 180.

Further, the specific broadcast content can include a broadcast content of a broadcast channel selected by a user, a broadcast content of a broadcast program, or a package type broadcast content. In particular, the specific broadcast content can include a broadcast content selected by a user without viewing authority or a broadcast content select as a purchase target according to execution of the broadcast content purchase function.

As mentioned in the above description, when the broadcast relevant data is the ESG data, the mobile terminal 100 is able to acquire the identification information of the image data matching a specific broadcast content from a specific file of the ESG data (particularly, the content fragment data), e.g., a synopsis field.

Subsequently, the mobile terminal 100 searches the memory 160 for the image data corresponding to the identification information acquired in the acquiring step S540 (S550). Further, the searching step S50 can be performed by the controller 180 or an element separately provided for the broadcast viewing authority management. In addition, the image data can have one of various files types including a still picture, moving picture, animation, flash and the like.

For instance, unique identification information may be included in each image data. Therefore, the mobile terminal 100 is able to search the image data in which identification information identical to the acquired identification information is included. When the identification information of the image data is included in the ESG data shown in FIG. 7, and if the mobile terminal 100 decides that the identification information included in the ESG data shown in FIG. 7 matches the acquired identification information, the mobile terminal 100 is able to search the image data in which the identification information included in the ESG data shown in FIG. 7 is included.

Figure 9D:
Figure 10C:

For instance, referring to FIG. 9D or FIG. 10C, the mobile terminal 100 displays an identifier, which announces the ongoing search for the image data matching the specific broadcast content and indicates an extent of the ongoing search, via the display 151. In addition, the identifier can be represented as one of various forms including an icon, emoticon, symbol, image, text, animation, progressive bar, etc. Also, to announce the completion of the searching step S550, the mobile terminal 100 can output an announcement sound, vibration, bell sound, blinker and/or the like via the output unit 150.

Subsequently, the mobile terminal 100 displays the image data searched in the searching step S550 via the display 151 (S560). For instance, when audio data matching the searched image data exists, the mobile terminal 100 outputs the audio data matching the image data via the audio output module 152. In addition, the image data displayed in the displaying step S560 primarily plays a role as a purchase picture for the corresponding broadcast content and is secondarily able to play a role in providing a visual effect and purchase information on the purchase target broadcast content. For example, the image data can be image sample data of the broadcast content such that a user can view the image sample data to determine if they want to purchase the broadcast content.

Also, prior to the execution of the displaying step S560, the mobile terminal 100 acquires the purchase information on the broadcast content matching the searched image data and is then able to display the acquired purchase information together with the image data.

In the following description, the purchase information on the broadcast content and the purchase information acquiring process are explained. In this example, the broadcast relevant information corresponds to the ESG data and a broadcast content corresponds to a package type broadcast content.

In addition, the purchase information on the broadcast content can be included in the ESG data. In particular, the purchase information can be included in private data within the ESG data. The purchase information can include a package name, a package content descriptor, a package cost, package expiry period information, package providing broadcast service provider information and the like.

Figure 11:
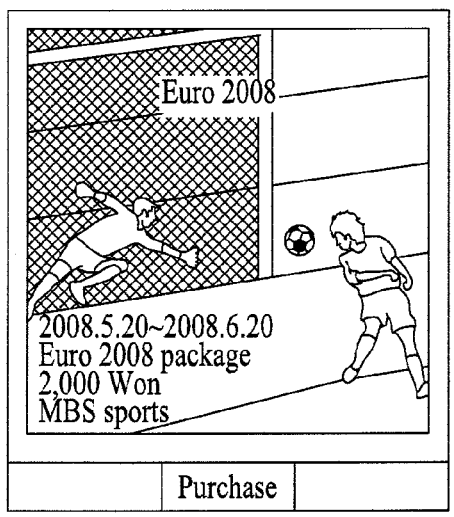
FIG. 11 is an overview of a display screen for displaying corresponding image data as a broadcast content purchase picture in a mobile terminal according to one embodiment of the present invention.

Using the controller 180 or a CAS module, the mobile terminal 100 is able to acquire the broadcast content purchase information included in the private data of the ESG data stored in the memory 160. Further, the purchase information of the corresponding broadcast content may be included in the displayed image data. Therefore, a user can be provided with the purchase information on the corresponding broadcast content, e.g., a broadcast content title, a viewing authority expiry period, a cost, a broadcast content provider and the like. For instance, FIG. 11 is an overview of a display screen on which the image data matching the corresponding broadcast content is displayed as a broadcast content purchase picture.

According to one embodiment of the present invention, the above-described method of controlling a broadcast content purchase in a mobile terminal can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include transmission via the Internet. Further, the computer can include the controller 180 of the terminal 100.

Accordingly, the present invention provides several advantages.

First, one embodiment of the present invention displays image data corresponding to a broadcast content to be purchased, thereby providing a visual effect for the broadcast content purchase. For example, the image data can be image sample data of the broadcast content such that a user can view the image sample data to determine if they want to purchase the broadcast content.

Second, one embodiment of the present invention provides sufficient information on a broadcast content to be purchased, thereby enhancing an efficient broadcast content purchase.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a wireless communication unit configured to receive a data packet, wherein the data packet includes a broadcast relevant data area including broadcast relevant data and an image data area including image data, wherein the image data includes a sample of a broadcast content, wherein the broadcast relevant data includes an electronic system guide (ESG), including a synopsis field and private data, the private data including a purchase information;
   a user input unit configured to select a broadcast content;
   a controller configured to:
   extract the broadcast relevant data and the image data from the data packet, and
   acquire identification information identifying image data matching the selected broadcast content from the extracted broadcast relevant data if a broadcast content purchase mode is entered to purchase the selected broadcast content, the identification information identifying image data being included in a content location field defined in file delivery data within the ESG of the selected broadcast content, and
   enter the broadcast content purchase mode when a viewing authority for the selected broadcast content does not exist or when a broadcast content purchase function is selected;
   acquire a purchase information of the selected broadcast content included in the private data of the ESG; and
   a display configured to display the image data identified by the identification information, the displayed image data including the sample of the selected broadcast content together with a purchase information and an option for purchasing the selected broadcast content,
   wherein the purchase information is displayed in an overlapping manner on the sample of the selected broadcast content and includes a viewing authority expiry period of the selected broadcast content.

2. The mobile terminal of claim 1, wherein the wireless communication unit is further configured to receive the image data matching the selected broadcast content when identification information included in the content location field matches information in the synopsis field extracted from the broadcast relevant data.

3. The mobile terminal of claim 2, wherein the wireless communication unit is further configured to receive the image data matching the selected broadcast content via a data packet equal to or different from a data packet of the broadcast relevant data.

4. The mobile terminal of claim 1, wherein the image data is image sample data of the selected broadcast content such that a user can view the image sample data to determine if they want to purchase the selected broadcast content.

5. The mobile terminal of claim 1, wherein the image data further includes audio data including audio information about the selected broadcast content.

6. A method of controlling a mobile terminal, the method comprising:
   receiving a data packet including broadcast relevant data and image data, wherein the image data includes a sample of a broadcast content, wherein the broadcast relevant data includes an electronic system guide (ESG), including a synopsis field and private data, the private data including a purchase information;

receiving a user's selection to select a broadcast content;
extracting the broadcast relevant data and the image data from the data packet;
entering a broadcast content purchase mode to purchase the selected broadcast content;
acquiring identification information identifying image data matching the selected broadcast content from the extracted broadcast relevant data the identification information identifying image data being included in a content location field defined in file delivery data within the ESG of the selected broadcast content;
acquiring a purchase information of the selected broadcast content included in the private data of the ESG; and
displaying the image data identified by the identification information, the displayed image data including the sample of the selected broadcast content together with a purchase information and an option for purchasing the selected broadcast content,
wherein the purchase information is displayed in an overlapping manner on the sample of the selected broadcast content and includes a viewing authority expiry period of the selected broadcast content.

7. The method of claim 6, wherein the receiving step further comprises receiving the image data matching the selected broadcast content based on matching a content location field and the synopsis field of the ESG.

8. The method of claim 7, wherein the image data matching the selected broadcast content is received via a data packet equal to or different from a data packet of the broadcast relevant data.

9. The method of claim 6, wherein the entering step enters the broadcast content purchase mode when a viewing authority for the selected broadcast content does not exist or when a broadcast content purchase function is selected.

10. The method of claim 6, wherein the image data is image sample data of the selected broadcast content such that a user can view the image sample data to determine if he or she wants to purchase the broadcast content.

11. The method of claim 6, wherein the image data further includes audio data including audio information about the selected broadcast content.

* * * * *